United States Patent
Ghosh et al.

(10) Patent No.: US 11,798,025 B1
(45) Date of Patent: Oct. 24, 2023

(54) INCREMENTAL SALES MODELING USING PROXY CAMPAIGNS

(71) Applicant: Target Brands, Inc., Minneapolis, MN (US)

(72) Inventors: Kunal Ghosh, Karnataka (IN); Shweta Baranwal, Karnataka (IN); Venkataramana Bantwal Kini, Sunnyvale, CA (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/886,691

(22) Filed: Aug. 12, 2022

(51) Int. Cl.
  *G06Q 30/00* (2023.01)
  *G06Q 30/0242* (2023.01)
(52) U.S. Cl.
  CPC ............... *G06Q 30/0243* (2013.01)
(58) Field of Classification Search
  None
  See application file for complete search history.

(56) References Cited

U.S. PATENT DOCUMENTS

| | | | |
|---|---|---|---|
| 7,689,456 B2 | 3/2010 | Schroeder et al. | |
| 7,707,059 B2 | 4/2010 | Reed et al. | |
| 10,699,203 B1* | 6/2020 | Ozcaglar | G06Q 10/067 |
| 11,010,785 B2 | 5/2021 | Boal | |
| 2014/0180790 A1 | 6/2014 | Boal | |
| 2014/0244368 A1 | 8/2014 | Singhania et al. | |
| 2020/0302486 A1 | 9/2020 | Ayoub et al. | |
| 2022/0180391 A1* | 6/2022 | Prakash | G06Q 30/0202 |

* cited by examiner

*Primary Examiner* — Alvin L Brown
(74) *Attorney, Agent, or Firm* — Merchant & Gould P.C.

(57) ABSTRACT

In general, methods and system for modeling the incremental value of a response to different types of treatment are disclosed. Some examples include modeling discount sensitivity for specific guests. One aspect is a method for modeling incremental sales for a retail enterprise which includes generating a proxy campaign. In some embodiments, the proxy campaign is used to train an uplift model to predict an uplift score for each guest in response to a proposed campaign. In some embodiments, the uplift score is used to select guests for the proposed campaign.

20 Claims, 15 Drawing Sheets

$$ISR = \frac{(avg\ treatment\ spend - avg\ control\ spend) * \#\ guests\ in\ treatment}{\$\ offer\ discount * \#\ guests\ in\ treatment}$$

FIG. 9A

$$ISR\_Mod = \frac{(avg\ treatment\ spend - avg\ control\ spend) * \#\ guests\ in\ treatment}{\$\ offer\ discount * \#\ guests\ in\ treatment\ who\ completed\ the\ offer}$$

INCREMENTAL SALES MODELING USING PROXY CAMPAIGNS

BACKGROUND

Retailers frequently run promotional campaigns to advertise goods and services sold by the retailer in order to ultimately increase sales and revenue. Some promotional campaigns are given to all guests. Additionally, some promotional campaigns are associated with events, such as a holiday. Other campaigns are targeted to certain guests of the retailer. In some of these examples, guests are selected for a targeted campaign, the goal of which is to maximize the incremental sales for that campaign. Typically, a retailer wants to target guests who will change their behavior in response to receiving a promotion. For example, the retailer may want to target a discount sensitive guest. In other words, a retailer wants to select guests that would not have made a purchase if the promotion was not given and will make a purchase, or rather has a high probability of making a purchase when the promotion is given.

Incremental sales modeling techniques can be used to identify discount sensitive guests. Some existing incremental sales modeling solutions use an historical campaign or a pilot campaign to collect data on a treatment group (a group of guests given a promotion). This data is compared to a control group (a group of guests not given a promotion) to calculate the incremental effect of a promotion. It is with respect to these and other general considerations that embodiments have been described.

SUMMARY

In general, methods and system for modeling the incremental value of a response to different types of treatment are disclosed. Some examples include modeling discount sensitivity for specific guests.

One aspect is a method for modeling incremental sales for a retail enterprise, the method comprising receiving guest profile data including historical campaign data for a plurality of guests, including a set of features for each guest, receiving a proposed promotion with a campaign goal, generating a proxy campaign by determining an eligible subset of guests from the plurality of guests for the proxy campaign based on the proposed promotion, for each eligible guest in the eligible subset of guests, calculating a ratio of promotional spend per item purchased by the eligible guest, and selecting a first group of guests for a treatment segment and a second group of guests for a control segment based on the calculated ratio of promotional spend per item purchased for each guest, and training an uplift model to predict an uplift score for each of the plurality of guests with the proposed promotion using the guest profile data for the first group of guests in the treatment segment and the guest profile data for the second group of guests in the control segment, wherein the proxy campaign is different from historical campaigns stored in the historical campaign data.

Another aspect is a platform for execution of machine learning models within a retail organization, the platform comprising one or more computing systems each including one or more processors and a memory, the memory storing instructions that cause the one or more computing system to receive guest profile data including historical campaign data for a plurality of guests and a set of features for each guest, receive a proposed promotion with a campaign goal, generate a proxy campaign, wherein to generate the proxy campaign includes to determine an eligible subset of guests from the plurality of guests for the proxy campaign based on the proposed promotion, for each eligible guest in the eligible subset of guests, calculate a ratio of promotional spend per item purchased by the eligible guest, and select a first group of guests for a treatment segment and a second group of guests for a control segment based on the calculated ratio of promotional spend per item purchased for each guest, and train an uplift model to predict an uplift score for each of the plurality of guests with the proposed promotion using the guest profile data for the first group of guests in the treatment segment and the guest profile data for the second group of guests in the control segment, wherein the proxy campaign is different from historical campaigns stored in the historical campaign data.

Yet another aspect is a computer implemented method for selecting guests for a proposed promotion, the computer implemented method comprising receiving the proposed promotion, generating a proxy campaign by determining an eligible subset of guests from a plurality of guests for the proxy campaign based the proposed promotion, for each eligible guest in the eligible subset of guests, calculating a ratio of promotional spend per item purchased by the eligible guest, and selecting a first group of guests for a treatment segment and a second group of guests for a control segment based on based on the calculated ratio of promotional spend per item purchased for each guest, training an uplift model to predict an uplift score for each of the plurality of guests with the proposed promotion using historical campaign data and guest features for the first group of guests in the treatment segment and historical campaign data and guest features for the second group of guests in the control segment, predicting an uplift score for each of the plurality of guests using the uplift model, determining a threshold uplift score which provides an optimal incremental sales value for the proposed promotion based on the predicted uplift scores for the plurality of guests, and selecting guests from the plurality of guests with a predicted uplift score above the threshold uplift score for the proposed promotion, wherein the proxy campaign is different from historical campaigns stored in the historical campaign data.

BRIEF DESCRIPTION OF THE DRAWINGS

FIG. 9A illustrates an example equation for calculating an incremental sales ratio, denoted by ISR, in accordance with some embodiments of the present disclosure.

FIG. 9B illustrates an example equation for calculating a modified incremental sales ratio, denoted by ISR_Mod, in accordance with some embodiments of the present disclosure.

FIG. 14 illustrates a table comparing incremental sales for a campaign when using a model trained on pilot campaign data to select guests, a model trained on proxy campaign data to select guests, and randomly selecting guests.

DETAILED DESCRIPTION

Figure 1:
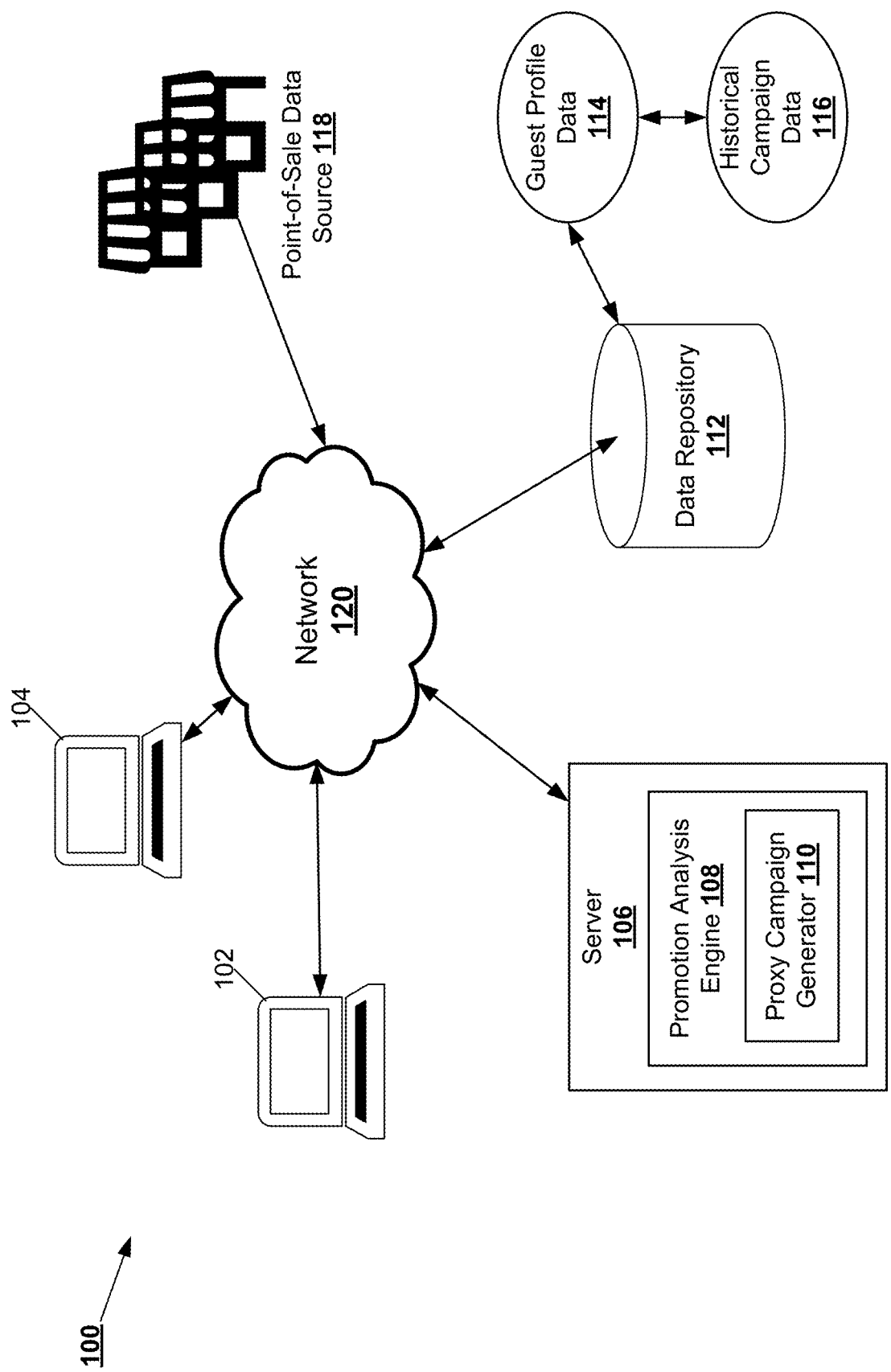
FIG. 1 illustrates an example environment for operating a promotion analysis engine, in accordance with some embodiments of the present disclosure.

As briefly described above, embodiments of the present disclosure are directed to modeling the incremental value of a response to different types of treatment. Some examples include modeling discount sensitivity for specific guests.

In general, this disclosure is directed towards systems and methods for modeling the incremental value of a response (e.g., sales) to different types of treatment (e.g., promotions). In some embodiments, one or more models (sometimes referred to herein as an uplift model) are used to estimate the incremental value of a response to a promotion for each guest. In some embodiments, the uplift model predicts which guests are likely to respond to a promotion based on characteristics of the guests. For example, the uplift model may predict which guests are discount sensitive (sometimes referred to as "persuadables"). The score for each guest output from the uplift model can be used to rank the guests in order to determine which guests should be selected for a future promotion.

In some embodiments, the method and systems disclosed herein describe improvements to uplift modeling. Specifically, traditional methods and systems for training an uplift model require historical campaign data for a similar campaign, or alternatively, require running a pilot campaign with the promotion. The historical campaign data from a similar promotion or the data collected as part of the pilot campaign is used as training data for the uplift model. However, retailers may wish to model new campaigns which are different than any of the prior campaigns included in the historical campaign data without needing to run a pilot campaign. Accordingly, systems and methods for generating a proxy campaign with the available historical campaign data are disclosed herein. The proxy campaign is used to train an uplift model for a new campaign which is different than the one or more campaigns in the historical campaign data. In some embodiments, the uplift model is trained using a combination of causal inference and machine learning.

In some examples, utilizing a proxy campaign will result in a model with broader applicability to other promotions than a model trained on a historical campaign or on a pilot campaign. For example, the proxy campaign can be generated to capture uplift at a more generic level by avoiding overfit from a specific campaign or a specific segment of guests. In contrast, using a historical campaign or a pilot campaign for training a model causes the model to be overfit to the promotion and/or the segment of customers used from the historical campaign or the pilot campaign, thereby potentially reducing accuracy of the model.

Furthermore, generally speaking, use of a proxy campaign reduces the amount of unnecessary training performed on segments of customers not likely to be ultimately included in a promotion, resulting in faster, more efficient projection of sales lift from a given promotion and faster identification of productive/useful promotional campaigns.

In some embodiments, the proxy campaign is used to artificially design treatment and control datasets intelligently, by taking account of promotional ratios and other guest profile features as "proxy" in order to train an uplift model for an upcoming campaign in scenarios where historical campaigns similar to upcoming campaign are either unavailable or running a pilot campaign similar to upcoming campaign for training data generation is infeasible.

FIG. 1 illustrates an example environment 100 for a retail enterprise performing promotion analysis. The environment includes a retail computing device 102, a guest computing device 104, a data repository 112, and a point-of-sale data source 118 each in digital communication with a sever 106 via a network 120 (e.g., the internet). In some embodiments, the server 106 is in direct digital communication with a data repository 112. The server 106 operates a promotion analysis engine 108 which includes a proxy campaign generator 110. The data repository 112 stores guest profile data 114 and historical campaign data 116.

Figure 2:
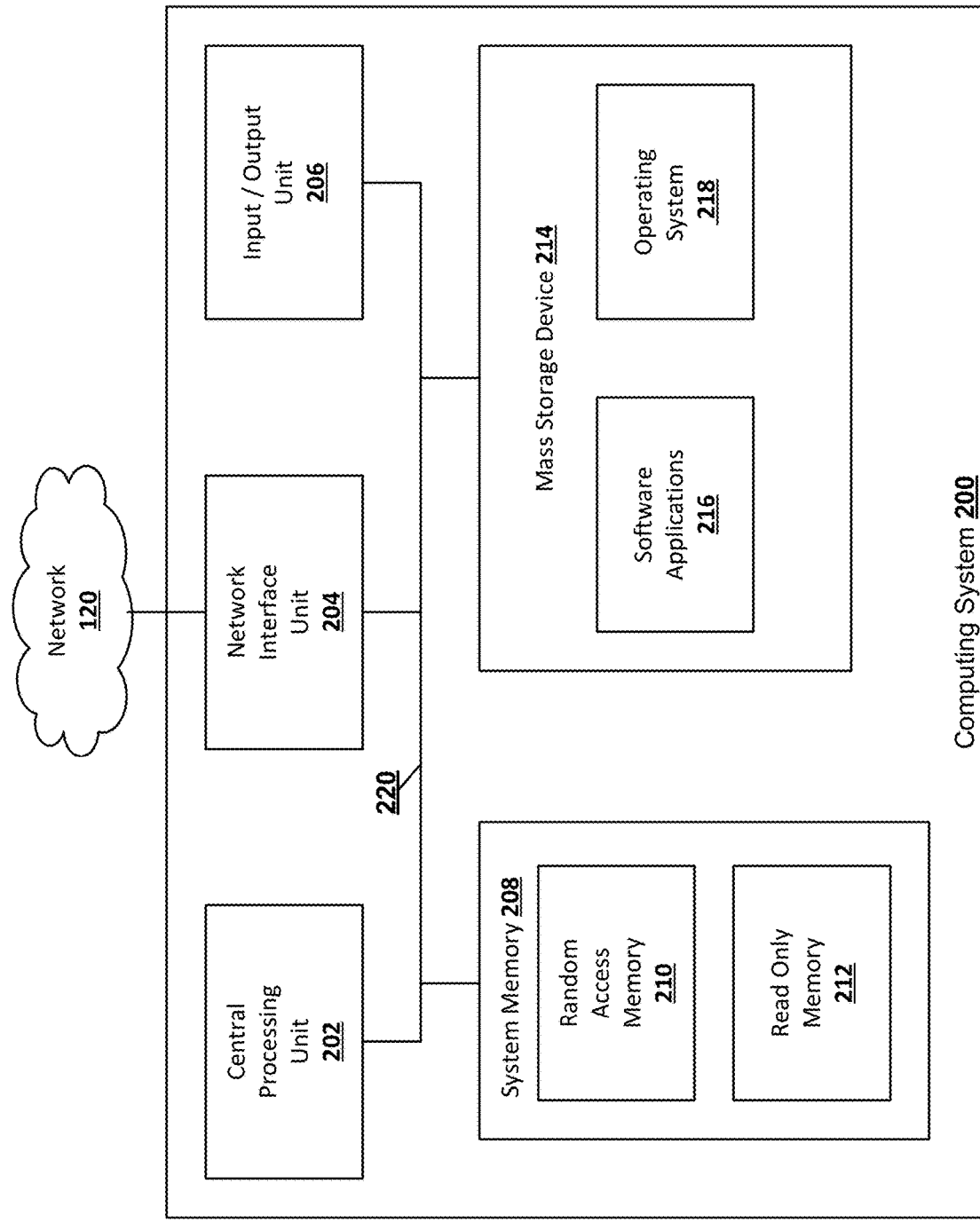
FIG. 2 illustrates an example block diagram of a computing system, in accordance with some embodiments of the present disclosure.

The retail computing device 102 is an electronic computing device for a retail user. For example, a retail user analyzing a proposed promotion can access the functionality of the promotion analysis engine 108 via an interfaces served from the server 106. The guest computing device 104 is an electronic computing device for a guest user. In some embodiments, the guest computing device 104 receives a message with a promotion (e.g., an email or a notification). In some examples, the retail computing device 102 and/or the guest computing device 104 can be a desktop computer, a laptop computer, a mobile electronic computing device, such as smartphone or a tablet computing device. An example block diagram of a computing system is illustrated in FIG. 2.

The server 106 may be a server computing system for an enterprise or organization that is a retailer of goods. The server 106 may include server computers of other types of enterprises as well. Although a single server 106 is shown, in reality, the server 106 can be implemented with multiple computing devices, such as a server farm or through cloud computing. Many other configurations are possible. In some examples, the sever 106 may be located at a central server location away from the retailer location. In other examples, the server 106 may be located at the retailer location.

Figure 3:
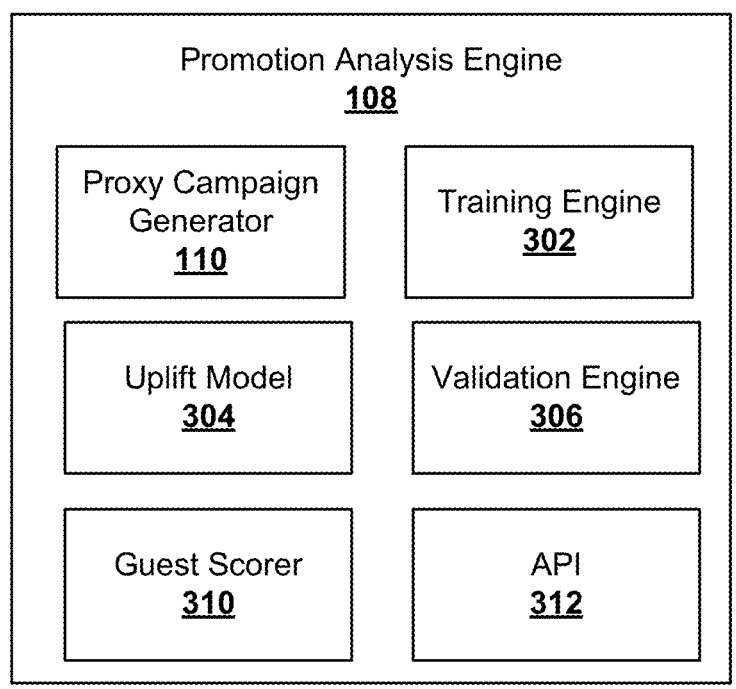
FIG. 3 illustrates an example promotional analysis engine, in accordance with some embodiments of the present disclosure.

The server 106 operates a promotion analysis engine 108. As will be described in further detail below, the promotion analysis engine 108 is utilized to predict an uplift score for each guests, wherein the uplift score relates to an incremental value of a guest's response when subject to different types of treatments (e.g., promotions). In some embodiments, the promotion analysis engine 108 operates an uplift model which is trained using machine learning to determine how a guest is likely to respond to a promotion based on a set of features for the guest. In some embodiments, the server 106 publishes an application programming interfaces (API) which allows the retail computing device 102 to interact with the promotion analysis engine. An example schematic diagram of a promotion analysis engine 108 is illustrated in FIG. 3.

The promotion analysis engine 108 operates a proxy campaign generator 110. The proxy campaign generator 110 generates a proxy campaign using the guest profile data 114 and the historical campaign data 116. In some embodiments, the data associated with the proxy campaign is used as training data for an uplift model. An example method 600 for generating a proxy campaign is illustrated and described in reference to FIG. 6.

In some embodiments, the data repository 112 includes one or more electronic databases that can store one or more data tables that includes data associated with the enterprise. In some embodiments, the data repository 112 exposes one or more application programming interfaces (APIs) that allow the server to access and/or provide data. The API may further receive data from the point-of-sale data source 118 via the network 120.

The data repository 112 stores guest profile data 114. In some embodiments, the guest profile data 114 includes set of features for a plurality of users. In some embodiments, the guest profile data 114 includes information provided by the user at the guest computing device 104. For example, the guest profile data 114 may include what items the user has purchased from an online platform, location information, what products the user has viewed based on associated web pages, etc.

The data repository 112 stores historical campaign data 116. The historical campaign data 116 is typically associated with a guest stored with the guest profile data 114 and includes data for previous promotional campaigns. For example, the historical campaign data 116 can include the information of which guests received the promotion and which guests did not receive the promotion and a response variable for each guest. The response variable indicates a level of completing of a campaign goal. In some examples, the response variable may include options for full or partial completion of one or more campaign goals. For example, the response variable is set to one value when the guest completes the campaign goal and to another value when the customer redeems the offer along with completing the campaign goal. In some embodiments, the response variable is a dollar amount. For example, the response variable can include the total amount spent by the guest for a specific trip. In some of these embodiments, the dollar amount includes the total amount spent by a guest with a promotion during a specific time period.

In some embodiments, the point-of-sale data source 118 includes a plurality of computing systems which are used at one or more retail store locations to complete and track purchases, manage inventory, manage guest accounts (e.g., rewards account), etc. In some embodiments, the uplift model is validated when a campaign with data collected at the point-of-sale data source 118.

In many embodiments, the data repository 112 stores guest profile data 114 and historical campaign data 116, in a relational database or in another type of database. For example, guest can be linked with historical campaign data with a guest ID or a guest entry may include fields for different historical campaigns.

In some examples, the network 120 is a computer network, such as the Internet. In some embodiments, the retail computing device 102 and/or the data repository 112 are connected to the server 106 via a private network (e.g., intranet).

FIG. 2 illustrates an example block diagram of a computing system 200. One or more aspects of the computing system 200 can be used to execute the promotion analysis engine 108, access the promotion analysis engine 108, collect data at point-of sale locations, process data, etc., as described in greater detail with reference to FIG. 1.

In the embodiment shown, the computing system 200 includes at least one Central Processing Unit (CPU) 202, a network interface unit 204, an input/output unit 206, a system memory 208, and a system bus 220 that couples the system memory 208 to the CPU 202. The system memory 208 includes Random Access Memory (RAM) 210 and Read-Only Memory (ROM) 212. A basic input/output system that contains the basic routines that help to transfer information between elements within the computing system 200, such as during startup, is stored in the ROM 212. The computing system 200 further includes a mass storage device 214. The mass storage device 214 is able to store software instructions and data. In many examples, the one or more processors are each implemented as the at least one CPU 202.

The mass storage device 214 is connected to the CPU 202 through a mass storage controller (not shown) connected to the system bus 220. The mass storage device 214 and its associated computer-readable data storage media provide non-volatile, non-transitory storage for the computing system 200. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 200.

According to various embodiments of the invention, the computing system 200 may operate in a networked environment using logical connections to remote network devices through the network 120. The computing system 200 may connect to the network 120 through a network interface unit 204 connected to the system bus 220. It should be appreciated that the network interface unit 204 may also be utilized to connect to other types of networks and remote computing systems. The computing system 200 also includes an input/output unit 206 for receiving and processing input from a number of other devices, including a touch user interface display screen, or another type of input device. Similarly, the input/output unit 206 may provide output to a touch user interface display screen or other type of output device.

Figure 10:
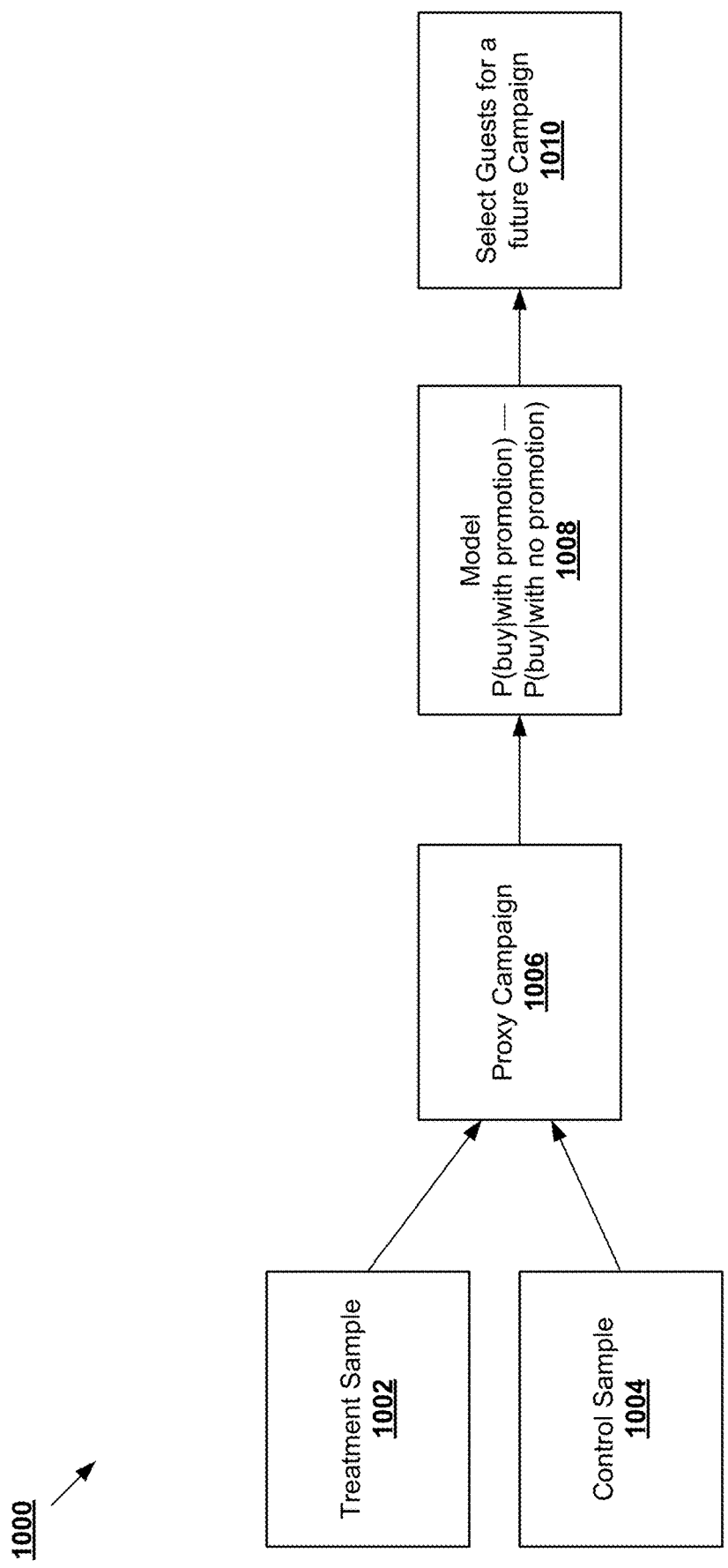
FIG. 10 illustrates an example flow diagram outlining an example method for selecting target guests for a campaign.

As mentioned briefly above, the mass storage device 214 and the RAM 210 of the computing system 200 can store software instructions and data. The software instructions include an operating system 218 suitable for controlling the operation of the computing system 200. The mass storage device 214 and/or the RAM 210 also store software instructions, that when executed by the CPU 202, cause one or more of the systems, devices, or components described herein to provide functionality described herein. For example, the mass storage device 214 and/or the RAM 210 can store software instructions that, when executed by the CPU 202, cause the computing system 200 to execute processes of the Promotion Analysis Engine 108, for example as shown in FIG. 1, FIG. 3, and FIG. 10.

FIG. 3 illustrates an example promotion analysis engine 108. The promotion analysis engine 108 operates a proxy campaign generator 110, a training engine 302, a validation engine 306, a guest scorer, uplift models 308, and an application programming interface (API) 310.

In some embodiments, the promotion analysis engine 108 receives a proposed campaign. The promotion analysis engine 108 may compare the campaign with a previous campaign. If historical campaign data exists for a similar campaign the promotion analysis engine 108 may determine that a proxy campaign does not need to be generated and will retrieve the historical campaign data for use by the training engine 302.

If historical campaign for a similar campaign to the proposed campaign is unavailable the promotion analysis engine 108 may instruct the proxy campaign generator 110 to generate a proxy campaign. The proxy campaign generator 110 operates to generate a proxy campaign. In some embodiments, the proxy campaign is generated based on the proposed campaign. For example, if a proposed campaign is made to provide a promotion during a specific time of year (for e.g. December), or during an event/festival (for e.g. Back-To-School/Easter), the proxy campaign generator may select guest data from the previous year's December or Back-To-School/Easter. Similarly, if the promotion is for a specific type of item the proxy campaign generator 110 may select guests with recorded transactions for that type of item or item category. In some embodiments, the proxy campaign generator 110 may select data based on the type of promotion given. For example, if the promotion was for a percent of a purchase or for a set dollar value off. Combinations thereof can be used to select data for the proxy campaign.

In some embodiments, the proxy campaign acts as a prior campaign to train an uplift model. The proxy campaign can include a dataset of guests with information of each guests past purchased including promotional and non-promotional purchases. This information can be used to segment guests into treatment groups and promotional groups. An example method 600 for generating a proxy campaign is illustrated and described in reference to FIG. 6.

The training engine 302 trains the uplift model 304. In some embodiments, the training engine 302 receives a proxy campaign from the proxy campaign generator 110. In some embodiments, the training engine 302 receives data for a treatment segment of guests and a control segment of guests. The treatment segment of guest is used to train a model to predict the likelihood a guest will take an action (e.g., make a purchase) in response to a promotion. In these examples, the training engine 302 will also train a control model to predict the likelihood a guest would take an action without receiving a promotion. In an additive formulation, the output from the control model can be subtracted from that of the treatment model to predict the incremental effect of the promotion.

The uplift model 304 is a model trained to predict an uplift score for a guest based on the guests features. In many embodiments, the uplift model is trained using machine learning. As described above, in some embodiments, the uplift model predicts the probability the guest would complete the campaign goal if given the promotion and compare that probability with the probability the guest would complete the campaign goal without the promotion.

The validation engine 306 validates the uplift model 304. In some embodiments, validating the uplift model 304 includes plotting the results. For example, a plot for guests in each decile comparing the control and treatment guests in each threshold can be analyzed to validate the model. Additionally or alternatively, a plot comparing the lift by decile can also be used. In some embodiments, a visualization of one or both of these plots is generated on a display to a retail users. In other embodiments, the data is automatically compared at a server or other computing device. In some embodiments, the uplift model is compared and validated against a random model. In some embodiments, the model is validated in real time as data is collected from a current campaign with a similar or same offer and completion goal. For example, the model can be validated and updated as the campaign is rolled out to guests.

The guest scorer 310 operates to score each guest with an uplift score. In some embodiments, a higher uplift score indicates that the guest is likely to respond better to a promotion, whereas a lower score indicates that the guest would respond regardless of the promotion or that the promotion may have a negative impact on the guest. In some embodiments, the uplift score correlates to the discount sensitivity of the guest.

The application programming interface (API) 312 is published to allow a retailer user to interact with the promotion analysis engine 108. The API may also be used for further modeling, or promotional analysis. In some embodiments, the API operates with a user interface which is provided by a server to a retail user.

In some embodiments, the training engine 302, the validation engine 306 and the guest scorer 310 are components of the uplift model 304. For example, the uplift model includes components which when executed by the processor perform the logic to operate the training engine 302, the validation engine 306, and the guest scorer 310.

Figure 4:
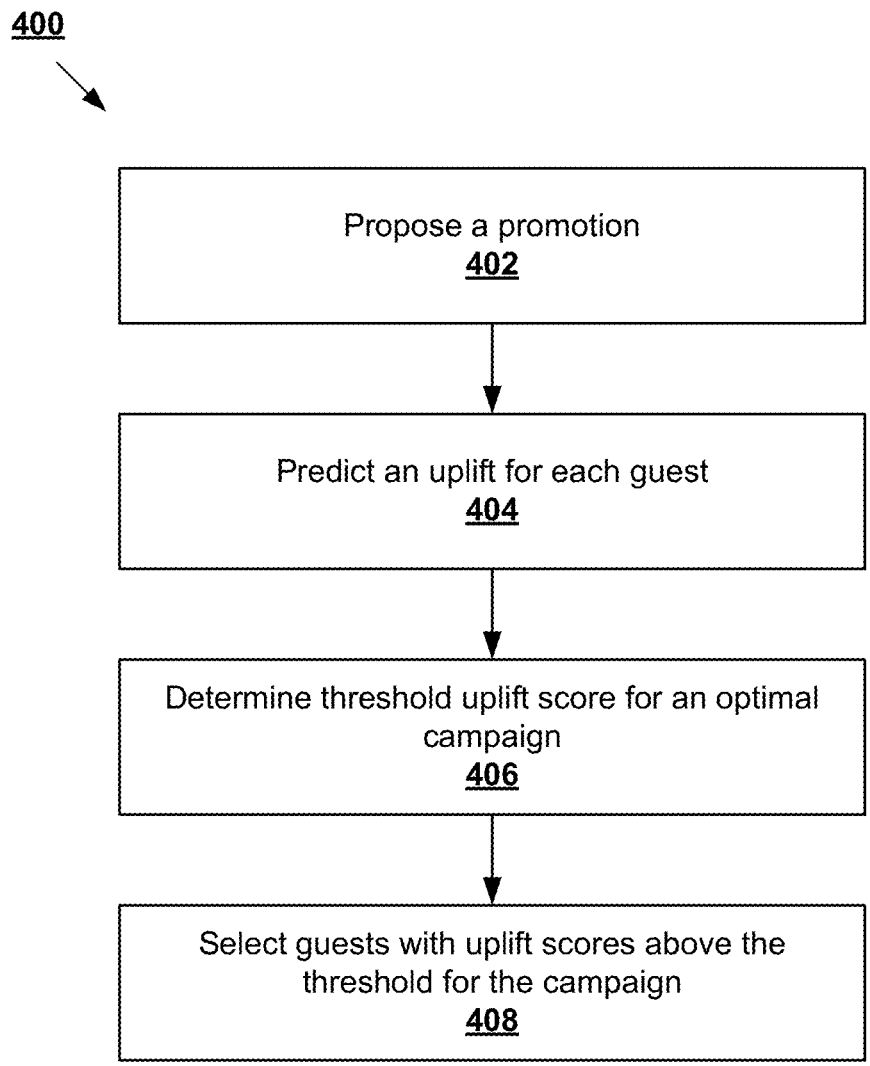
FIG. 4 illustrates an example method for selecting guests for a proposed campaign, in accordance with some embodiments of the present disclosure.

FIG. 4 illustrates an example method 400 for selecting guests for a proposed campaign. In some embodiments the method 400 is executed as part of the promotion analysis engine 108. The method 400 includes the operation 402, 404, 406, and 408.

The operation 402 proposes a promotion. In some embodiments, a retailer user (e.g., business analyst, or marketing user) proposes a promotional campaign that the retail user wants to model. The campaign can include one or more promotions. The promotion includes at least one offer (e.g., deal) and at least one campaign goal. An example of a promotion includes five dollars off when a guest spends twenty dollars, where the offer is five dollars off and the campaign goal is for the user to spend twenty dollars. Typically, a promotion will include a time period. For example, the promotion may be valid through a set date or for a predetermined range of dates. In some embodiments, a retailer user selects multiple promotions to compare the incremental sales lift for each promotion. For example, a retail user may want to model and compare a five dollar promotion for spending twenty dollars with a 10 dollar promotion for spending forty dollars. In some embodiments, a computing system selects a proposed campaign automatically based on data from historical promotional campaigns. For example, a proposed campaign may be selected based on the data being available to generate a proxy campaign. In some embodiments, the proposed campaign is generated based on the time of year (e.g., around a holiday).

The operation 404 predicts an uplift score for each guest. The uplift score is the predicted incremental value the proposed promotion has on the guest. In some embodiments, the uplift score predicts the increase in redemption of an offer, increased trips to the retailer, increased number of itemized purchased (e.g., increased basket size), increase in gross spend, increase in net spend, etc. In typical embodiments, a high uplift score indicates a guest is discount sensitive and a low uplift score indicates a guest is not discount sensitive.

In some embodiments, an uplift model is used to rank guests for the proposed campaign based on a predicted probability that the promotion would lead to an improved outcome. In some embodiments, the uplift model is trained using historical campaign data to determine which features of guests are correlated with different responses to a promotion. In some embodiments, an uplift model uses machine learning to determine how a guest is likely to respond to a promotion based on features of the guest. In some embodiments a two model approach is used with a first model used for a treatment group and a second model used for a control group. In some of these embodiments, the output from the control model is subtracted from the output of the treatment model. In some embodiments, the operation 404 includes executing the method 500 illustrated in FIG. 5.

The operation 406 determines threshold uplift score for an optimal campaign. In some embodiments, the optimal campaign maximizes incremental sales by selecting guests for the promotion which will provide the greatest effect on a guest user while not selecting guests which would otherwise meet the campaign goal without the promotion. In some embodiments, the threshold is determined using the method 800 illustrated and described in reference to FIG. 8.

In some embodiments, the operation 406 includes thresholds for placing guests in different groups based on the predicted uplift score. For example, a "persuadables" group for guests that are likely to respond because of the promotion, a "sure things" group for guests which would respond regardless of the promotion, a "lost causes" group for guests which did not respond and where the promotion had no impact, and a do not disturbs group which did not respond and the promotion had a negative impact. In some embodiments, a single threshold is used to isolate the "persuadables" from the other groups. In some embodiments, a single threshold is used to filter out the "do not disturbs" group. An example diagram outlining the different groups is illustrated and described in reference to FIG. 11. An example graph 1200 illustrating the segmentation of guest into different groups is illustrated and described in reference to FIG. 12.

The operation 408 selects guest with uplift score above the threshold for the campaign. In some embodiments, the guests above the threshold and filtered and selected to receive the promotion. In some embodiments, the guests may automatically receive a message with the promotion (e.g., an email or a notification on a mobile computing device) after being selected.

Figure 5:
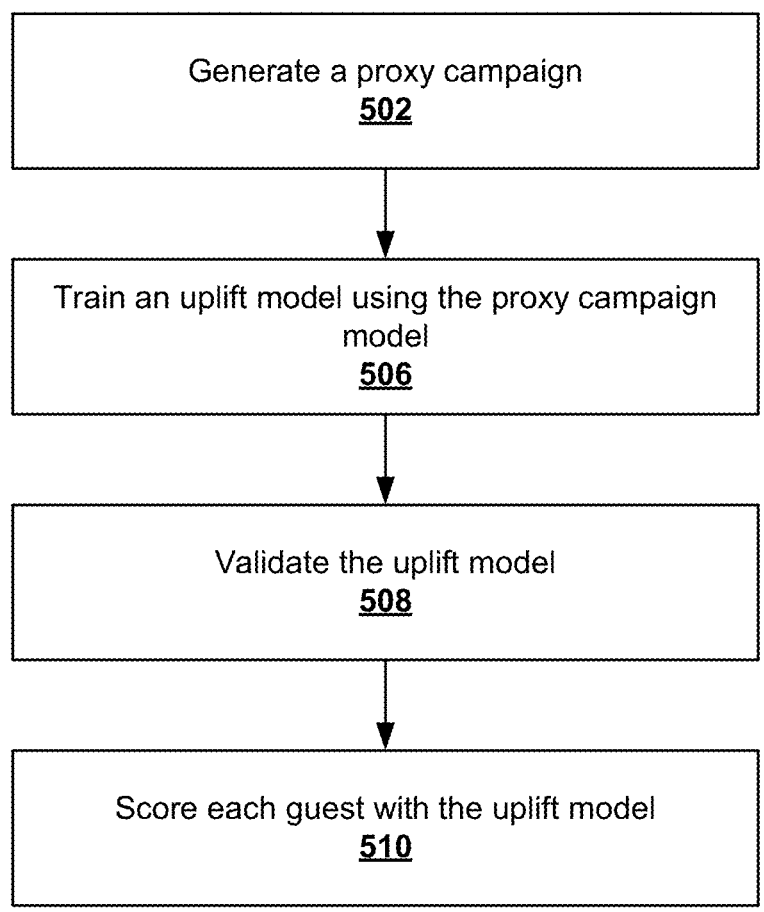
FIG. 5 illustrates an example method for analyzing a promotion, in accordance with some embodiments of the present disclosure.

FIG. 5 illustrates an example method 500 for analyzing a promotion. In some embodiments, the method 500 is executed as part of the promotion analysis engine 108. In some embodiments, the method 500 is an example method for the operation 404 illustrated and described in reference to FIG. 4. The method 500 includes the operations 502, 504, 506, 508, and 510.

The operation 502 generates a proxy campaign. In some embodiments, the proxy campaign is generated using historical campaign data. In some embodiment, the historical campaign data is retrieved from a data repository. In alternative embodiments, the historical campaign data is collected using a pilot campaign. The historical campaign data includes a plurality of guests, wherein each guest includes a set of features and a response variable. Examples of features included in the set of guest features include whether the guest is part of a rewards program, types of items purchased by the guest, shopping patterns (e.g., around holidays), frequency of shopping, etc. These features as well as data related to how the guest reacted to historical data can be used to generate a proxy campaign. An example method 600 for generating a proxy campaign is illustrated and described in reference to FIG. 6. Example graphs 1502 and The operation 504 segments the historical campaign data. In some embodiments, the historical campaign data is segmented into a control group and a treatment group. The treatment group is a group of guests which received a promotion and the control group includes guests which did not receive the promotion or include features (e.g., amount of promotion spend) which reflect an expected bias in a group of users which did not receive a promotion. In some embodiments, a sample of guests are selected from the plurality of guests stored in the data repository. For example, guest can be selected using random sampling and placed in one of the treatment or control groups. In some embodiments, guests can be selected using stratified sampling aided by a heuristic method.

The operation 506 trains an uplift model using the segmented historical campaign data. In typical embodiments, a two-model approach (T-learner) is used to model uplift. In some of these embodiments, gradient boosted trees are used for the training the two models. In some embodiments, a regressive model is used. For example, a regressive model can be trained where the response variable is a dollar spent by a guest. In these examples, the treatment model may predict a dollar spend for a guest with a promotion, the control model will predict the dollar spend without the promotion, and the uplift score for the guest is the dollar lift calculated by subtracting the dollar amount predicted by the control model from the dollar amount predicted by the treatment model. In some embodiments, a classification model is used. An example for training an uplift model is illustrated and described in reference to FIG. 6.

The operation 508 validates the uplift model. In some embodiments, the uplift model is validated against another segment of historical campaign data. In some embodiments, the uplift model is validated against a random model. In some embodiments, the model is validated against real time data collected as the proposed campaign is rolled out to users.

The operation 510 scores guests with the uplift model. In some embodiments, an uplift score is calculated for each guest. In other examples, an uplift score is calculated for each guests in a segment of guests. For example, all guests in a specific country or all guests with a rewards account. In some embodiments, a random sample of guests are scored.

Figure 6:
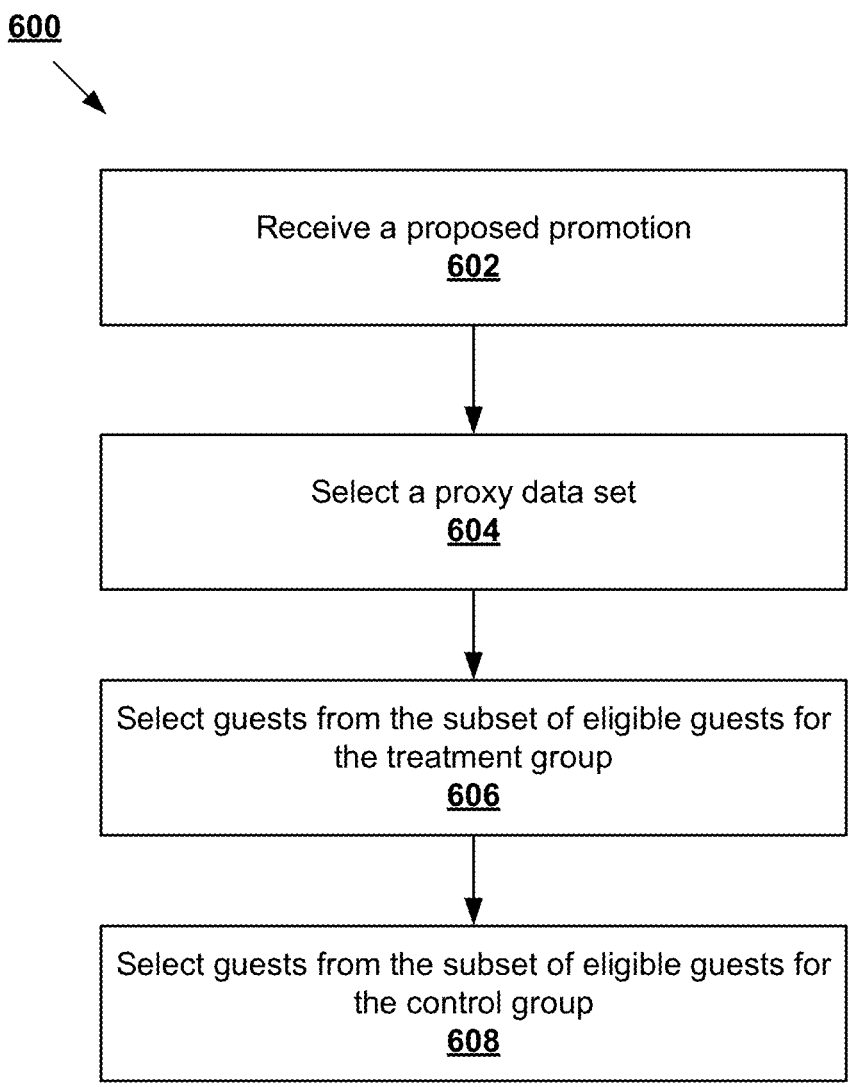
FIG. 6 illustrates an example method for generating a proxy campaign, in accordance with some embodiments of the present disclosure.

FIG. 6 illustrates an example method 600 for generating a proxy campaign. In some embodiments the method 600 is performed as part of the operation 502 illustrated in FIG. 5. In some embodiments, the method 600 is performed by the proxy campaign generator 110 illustrated and described in reference to FIG. 1. The method 600 includes the operations 602, 604, 606, and 608.

The operation 602 receives a proposed promotion. In typical embodiments, the proposed promotion is part of potential campaign and is received from a retail user. Examples of promotions are described herein.

The operation 604 selects a proxy data set. The proxy data set typical includes information for a subset of eligible guests. In some embodiments, a data repository stores guest profile data and historical campaign data. The proxy data set compiles information from the guest profile data and historical campaign data. The proxy dataset includes a plurality of guests features and past purchases made by the guest including which purchases were made with a promotion. In some embodiments, data for the guests include what purchases are made on a day level and/or on an item level.

In some examples, the set of guests features include features such as most recent trip, repeat trips, average spend, average number of items purchased per trip, amount spent on most recent trip, if the guest recently used a holiday promotion. As described above this information can be calculated using the guest profile data 114 and historical campaign data 116, as shown in FIG. 1.

Additionally, the proxy data set can include a response variable for each guest. In some embodiments, the response variable is the dollar spend of the guest during a response date range. As described below, in some embodiments, when training a model for the treatment group all sales data are included in the response variable, and when training a model for the control only sales without a promotion are included with the response variable.

In some embodiments, the proxy data set includes generic proxy data. In some embodiments, generic proxy data is used when the proxy data set does not include information on how to segment the guests. In these examples, the proxy data set can include all guests or all guests which are a part of rewards program. In some of these embodiments, a preliminary model is trained to predict an uplift score for each guest. Each guest is then scored and ranked and the treatment group and control groups are selected from the highest ranking guests at the operations 606 and 608. In some embodiments, the guests are ranked by decile, with guests in the top decile being selected for the treatment group (at operation 606) and the control group (at operation 608).

In some embodiments, the proxy data set is compiled by selecting a subset of guests which have met a criteria. For example, the proxy data set is compiled by selecting a subset of guests which have spent a certain amount of money during a specified time period. Another example could include compiling all guests which purchased an item of certain type during a set time period.

The operation 606 selects guests from the subset of eligible guests for the treatment segment and the operation 608 selects guests from the subset of eligible guest for the control segment. In some embodiments, guests are placed in the treatment group and control group based on a ratio of promotion spend per item of the guest. The ratio of promotion spend per item of the guest is calculated using the guest profile data and the historical campaign data. Guests above a certain threshold or above a specified score are selected for the treatment group at the operation 606. In some embodiments guests with a ratio above a certain score are assigned a flag. In some embodiments, the guests above the score are randomly sampled for the treatment group. In other examples, a heuristic model is used to assign a treatment flag to guests which are either placed directly in the treatment group or sampled before being place in the treatment group.

In some embodiments, guests with a ratio of promotion spend per item below a set threshold or within a predetermined range are selected for the control group at the operation 608. In some embodiments, the control group randomly samples guests with a ratio of promotion spend per item below a threshold or within a range. In some embodiments, a threshold is selected which will reflect a similar bias found in a historical campaign. For example, the proxy campaign may select a data set which will result in a ratio of promotion spend per item that is similar to a ratio of promotion spend per item in a historical campaign.

Other metrics can also be used, or a predetermined policy can be used to place guests in treatment and control groups. In some embodiments, a machine learning model is used to select guests for the treatment or control group. In some examples, a plurality of groups are selected and modeled with and the uplift scores are averaged for each of the groupings.

Figure 7:
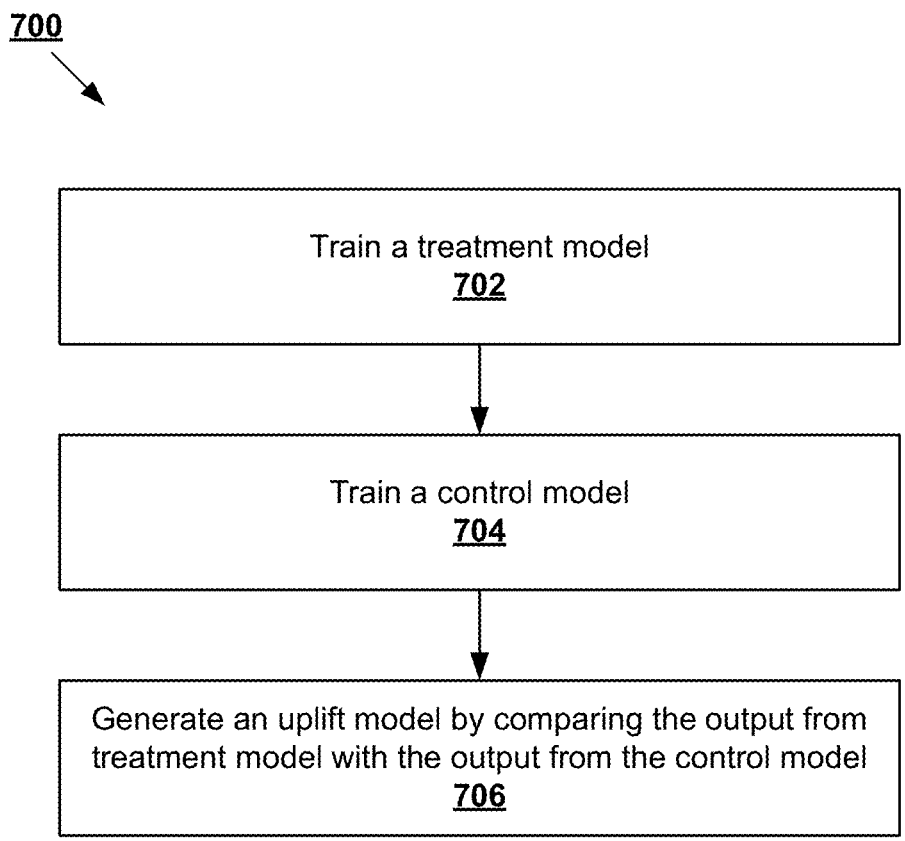
FIG. 7 illustrates an example method for training an uplift model, in accordance with some embodiments of the present disclosure.

FIG. 7 illustrates an example method 700 for training an uplift model. The method 700 is an example of the operation 506 illustrated and described in reference to FIG. 5. The method 700 includes the operations 702, 704, and 706.

The operation 702 trains a treatment model. In some embodiments, the treatment model is trained to predict an expected response for a guest when given a promotion. For example, the model can predict the likelihood that guest will complete the campaign goal and/or redeem the offer. Other variables can also be predicted such as increase purchases at the retailer, increase in the amount of money spent at the retailer. In some embodiments, the model is trained to operate as a one-shot conditioning model, wherein a vector of the guest features are provided to condition the treatment model. In some embodiments, the treatment model predicts the amount the guest user would be spending if given the promotion. In some embodiments, the prediction includes the amount the guest would spend during a set period of time (e.g., between two dates). Other examples can include how much the guest would spend given a promotion in the next week, the next month, etc.

The operation 704 trains a control model. The control model predicts a response of a guest that does not receive the promotion. In some embodiments, the control model predicts the likelihood the guest makes a purchase without the campaign.

The predictions made at the operations 702 and 704 can be based on features of the guests. Examples of features include: a number of trips made by the guest, a total interval the guest has been a customer of the retailer, an average amount spent during a holiday shopping period, an average number of items purchased during a holiday period, if the guest shopped a previous holiday, an average proportion of promotional items purchased, an average proportional value of promotional items, if the guest purchased a promotion item during a previous trip, an average basket size (e.g., number of items purchased per trip or per online shopping transaction), an average basket value, an average number of categories in which the guest shopped, a recent transaction basket size, a recent transaction basket value, a recent transaction category count, a proportion of total trips made in-store, etc. These features are used to determine how a type of guest will respond to a promotion in the operation 702 and how a type of guest will respond without the promotion in the operation 704. In some embodiments, the guest features include item specific information or item category specific information. For example, the average amount of promotion spend on groceries, fruit, and/or apples.

In some embodiments, both the treatment model and the control model include a trained one-hot model which is conditioned based on the encoded guests features.

In some embodiments, the output of the treatment model and the control model is m-dimensional encoding for different items or category of items. For example, a value in the m-dimensional encoding is set to 1 if the item or category of item was purchased. In these examples, the m-dimensional encoding output from the control model (e.g., describing the items purchased without an offer) is subtracted from the m-dimensional encoding output from the treatment model (e.g., describing the items purchased with an offer) at the operation 706. Using m-dimensional encoding outputs allows for the scoring on the guest, offer, and item level.

In some embodiments, the treatment model and/or control model are trained on offer specific features. Examples of offer features include a proportion of total trips when a transaction amount is more than the offer base amount, a proportion of transaction when the amount is more than the offer base amount with a promotion, whether guest made the transaction worth offer base amount last month, number of days since the guest made the transaction of an amount greater than offer base amount, if max spend of guest is below the offer base amount, if max spend of guest is above the offer base amount. Example graphs 1500 and 1502 showing the improvements from training the uplift model with offer features are illustrated and described in references to FIGS. 15A and 15B.

The operation 706 compares the output from the control model with the treatment model. In some embodiments, the output from the control model is subtracted from the output of the treatment model. This arrangement removes guests who likely would have made the same purchase with or without the promotion or can determine which guests will result in the greatest uplift. For example, the treatment model may predict a guest will spend $100 with or without a promotion and the control model may predict the guest would spend $90 without the promotion and the operation 706 would calculate the uplift score for this guest as $10. In other embodiments, when the output for each of the treatment model and the control model is binary (e.g., assigned "1" if campaign goal was met and "0" if campaign goal was not met) the predicted uplift will be "1" if the user is predicted as only completing the campaign goal with or without the promotion and "0" if the user would have met the campaign goal without the promotion. In further examples, the output of each of the treatment model and the control model is a probability. For example, the treatment model may predict a user is 90% likely to complete a campaign goal if or if not given the promotion and the control model may predict the user is 50% likely to complete the campaign goal if not given the promotion. In this example, the predicted uplift from the promotion would be 40% (90% subtracted by 50%).

Figure 8:
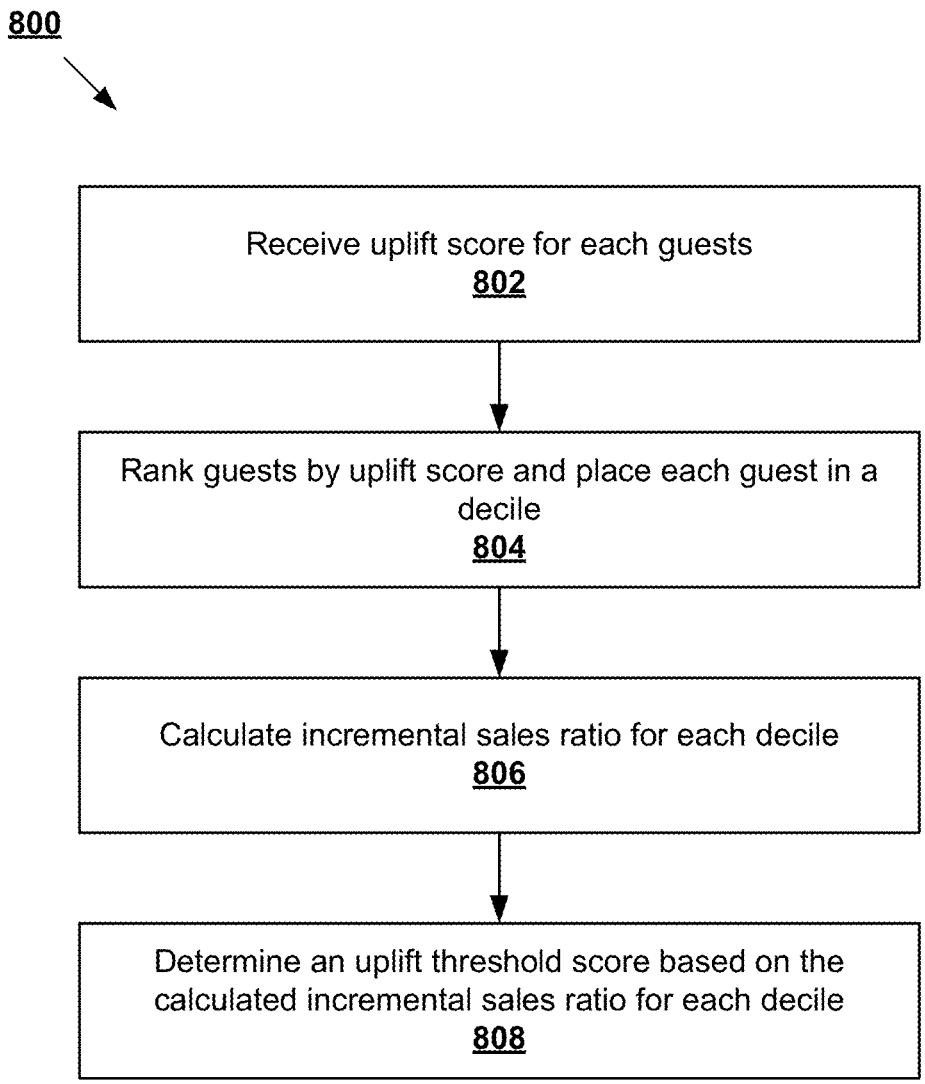
FIG. 8 illustrates an example method for determining a threshold uplift score, in accordance with some embodiments of the present disclosure.

FIG. 8 illustrates an example method 800 for determining a threshold uplift score. In some embodiments, the method 800 is part of the operation 408 for selecting guests based on the determined threshold uplift score. The method 800 includes the operation 802, 804, 806, and 808.

The operation 802 receives an uplift score for each guest. Examples for predicting uplift scores for each guests are described herein. For example, the operation 404 illustrated and described in FIG. 4 and operation 510 illustrated and described in FIG. 5.

The operation 804 ranks guests by uplift score and places each guest in a decile. In some embodiments, the guests are each placed in a decile based on the modeled uplift score. For example, each guest can be placed in a group of ten groups equally based the guest's uplift score. In other examples, the guest can be placed in quartiles. Other percentiles can also be used.

The operation 806 calculates an incremental sales ratio (ISR) for each decile. In some embodiments, the operation 806 calculates an incremental sales ratio using the equation illustrated in FIG. 9A. In some embodiments, the operation 806 calculates an incremental sales ratio (ISR_Mod) using the equation illustrated in FIG. 9B. In typical embodiments, the ISR is calculated for each decile. Typically, the ISR decrease as the uplift score threshold decreases, as more guests with low uplift scores are included. In some embodiments, the ISR is the ratio of uplift over the amount of the discount. Additionally or alternatively, the ISR can be used to compare different promotions or different models. For example, the ISR can be used to validate a model (e.g., after running a pilot campaign.).

The operation 808 determines a threshold uplift score based on the calculated incremental sale ratio for each decile. In typical embodiments, the threshold uplift score is based on the required number of guests for the proposed promotion and the calculated ISRs.

FIG. 9A illustrates an example equation for calculating an incremental sales ratio (ISR). The ISR equation in FIG. 9A calculates the difference of the average treatment spend and the average control spend multiplied by the number of guest in the treatment the result of which is divided by the result of the offer discount multiplied by the number of guests in the treatment.

FIG. 9B illustrates an example equation for calculating a modified incremental sales ratio (ISR_Mod). The ISR_Mod equation in FIG. 9B calculates the difference of the average treatment spend and the average control spend multiplied by the number of guest in the treatment the result of which is divided by the result of the offer discount multiplied by the number of guests in the treatment who completed the offer.

FIG. 10 illustrates an example flow diagram outlining an example method 1000 for selecting target guests for a campaign. The method 1000 receives treatment sample inputs 1002 and a control sample inputs 1004. In some embodiments, the treatment sample inputs 1002 and a control sample inputs 1004 are selected to model a bias in a previous campaign. Examples for determining a treatment sample inputs 1002 and control sample inputs 1004 are described herein. The treatment sample inputs 1002 and the control sample inputs 1004 are used to generate a proxy campaign step 1006. The proxy campaign data is used as training data to train a model 1008. The model 1008 predicts an uplift score for each guest. The predicted uplift score is used to select targets for the campaign 1010. In some embodiments, each guest is placed in a group (e.g., the groups illustrated in FIG. 11) based on the predicted uplift score for each guest. In some embodiments, guests placed in a persuadables group are selected.

In some embodiments, the model 1008 includes two models a first model predicts a probability a given guest will make a purchase with or without the promotion. A second model predicts a probability that the given guest will make a purchase without the promotion. The output from the second model is subtracted from the output from the first model to predict an uplift score for the guest. This score is used to select guests for a future campaign at step 1006.

Figure 11:
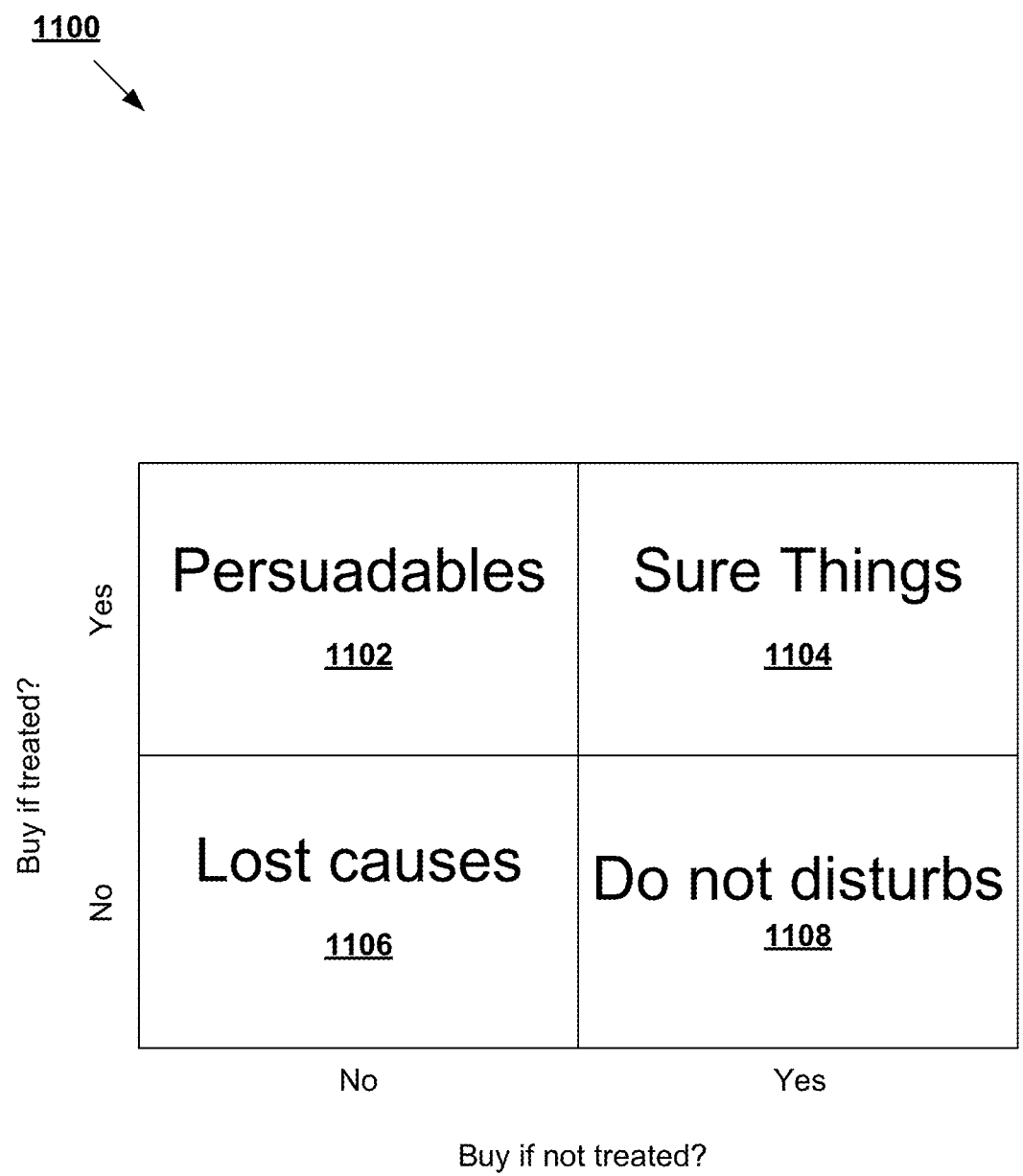
FIG. 11 illustrates various groups guest can be placed in based on predicted uplift scores.

FIG. 11 show various groups guests can be placed in based on predicted uplift scores. The groups include a persuadables group 1102, a sure thing group 1104, a lost cause group 1106, and a do not disturb group 1108. In some embodiments, guests are placed in groups based on the predicted uplift score for each guest.

The persuadables group 1102 includes guests who responded because of the promotion. In some embodiments, the objective for the campaign is to target as many guests in the persuadables group 1102 as possible as this will result in the highest overall uplift for the campaign.

The sure thing group 1104 includes guests who would respond regardless of the promotion. In general, the objective of a campaign is to avoid targeting guests in the sure thing group 1104, as these guests would make a purchase regardless the promotion.

The lost cause group 1106 includes guests where the promotion did not have an impact. In general, the objective of a campaign is to avoid targeting guests in the lost cause group 1106 because the promotion does not impact the guest.

The do not disturb group 1108 includes guests who did not respond to the promotion and the promotion had a negative impact. In typical embodiments, the objective for the campaign is to avoid targeting guests in the do not disturb group 1108.

Figure 12:
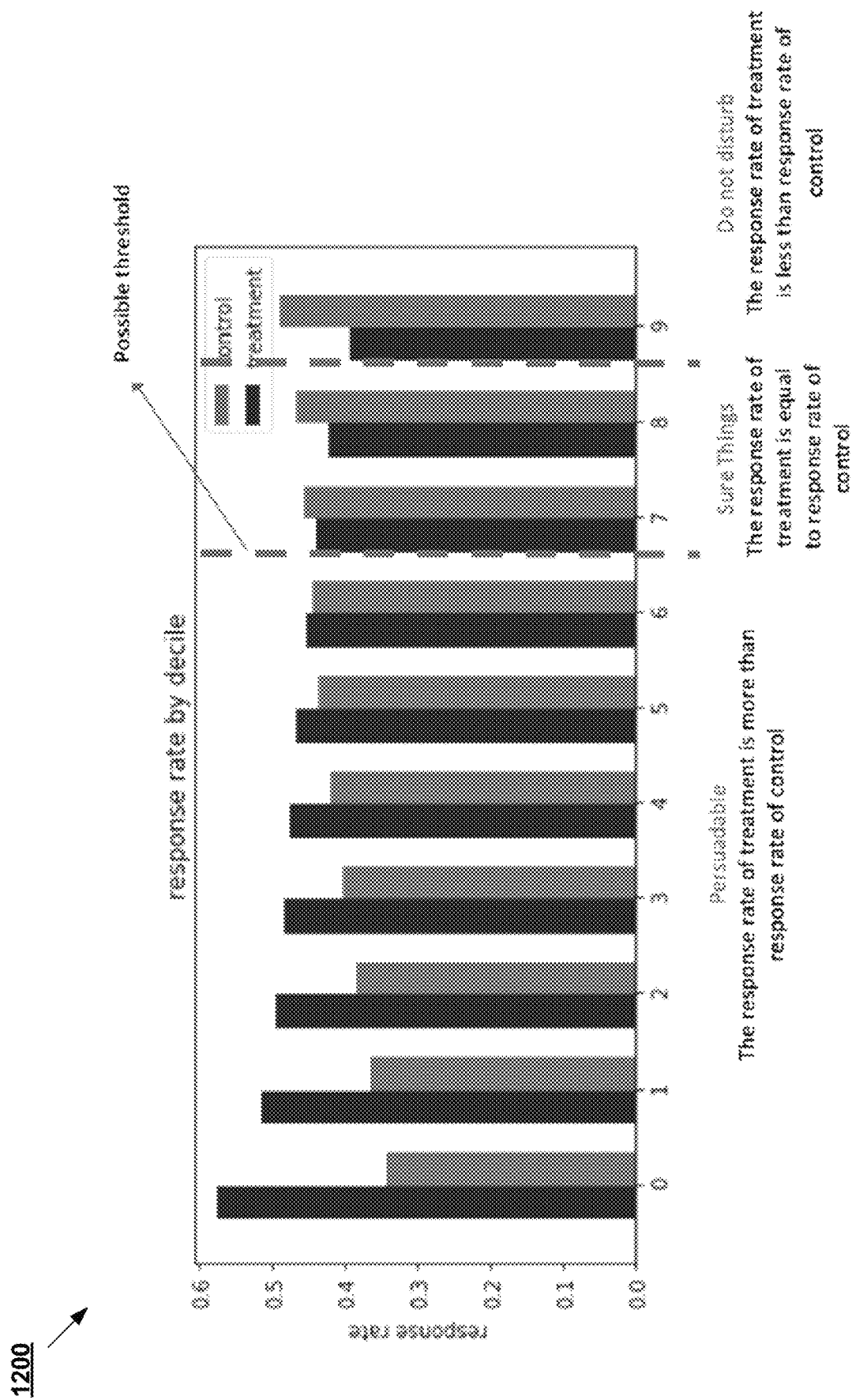
FIG. 12 illustrate an example graph illustrating the determination of thresholds used for placing guests in groups.

FIG. 12 illustrate an example graph 1200 illustrating the determination of thresholds used for placing guests in groups. In the example shown, the guests in each of a treatment and control group are ranked and placed in to deciles based on a response rate (e.g., whether the guests completed the campaign goal). The response rate in each decile for the treatment group and control group are compared to determine a threshold for the different groups. In the graph 1200, the threshold for the persuadables group includes each decile where the response rate of the treatment group is more than the response rate of the control group. A second threshold is shown for the sure things and do not disturb groups. The sure things group includes where the response rate of the treatment group is only slightly less than or almost equal to the response rate of the control group. The do not disturbs group includes deciles where the response rate of the treatment is more lesser than the response rate of the control group. Although two thresholds are shown in the graph 1200 in many embodiments only guests in the persuadables group are targeted. Accordingly, only one threshold (for the persuadable group) needs to be determined for many embodiments.

Figure 13:
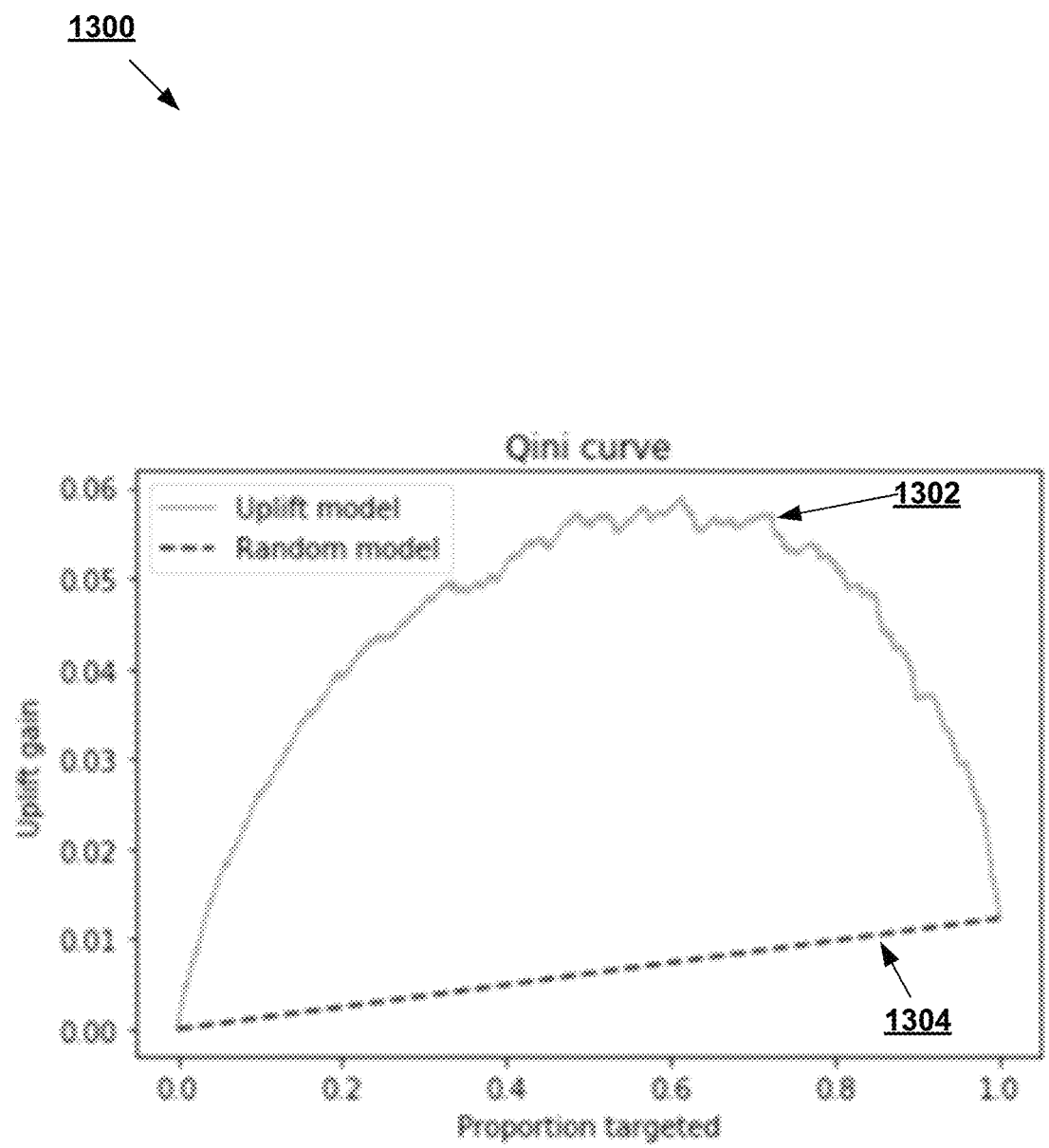
FIG. 13 illustrates an example graph comparing the uplift model trained with proxy data versus a randomly trained model.

FIG. 13 illustrates an example graph 1300 comparing the uplift model training with proxy data versus a random model. In the example shown, the uplift model trained with proxy data 1302 is illustrated in a solid line and the random model is illustrated with a dashed line. As shown the models have the same results when 0 proportion of guests are targeted and when all guests are targeted. The uplift model trained on proxy data illustrates a curve which generally shows greater uplift as a greater portion of guests are targeted up until an apex where the uplift decreases as more guests in the sure things group and do not disturb group are targeted. As illustrated in the graph 1300, using a proxy campaign data to train a model produces results which are closer to an actual (pilot campaign) model than the random model. Additionally, using a well-selected number of guests based on a predicted uplift results in a better overall uplift than randomly selecting guests.

Figure 14:
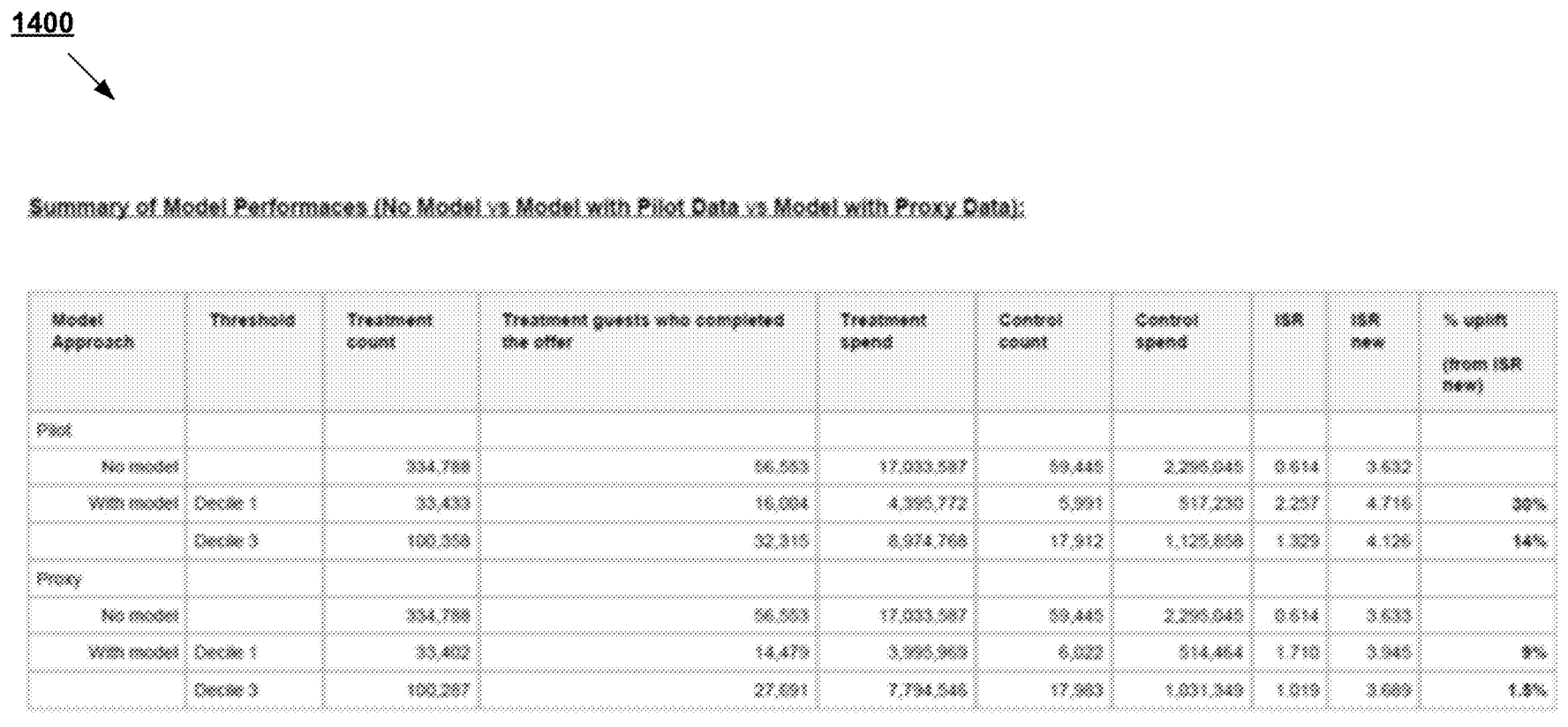

FIG. 14 illustrates a table 1400 comparing incremental sales for a campaign when using a model trained on pilot campaign data to select guests, a model trained on proxy campaign data to select guests, and randomly selecting guests (no model). As shown in the chart the ISR and ISR_Mod are both improved when using a model trained on either a pilot campaign or a model trained on a proxy campaign as compared to randomly selecting guests. Also shown is that the ISR and ISR_Mod using a proxy campaign is relatively close to the ISR and ISR_Mod for a pilot campaign. Accordingly, generating a proxy campaign to generate training data for an uplift model results in a model which can be used to accurately select guests for a campaign. In some embodiments, the proxy campaign is used as a substitute to a pilot campaign when a corresponding pilot campaign is not available.

Figure 15A:
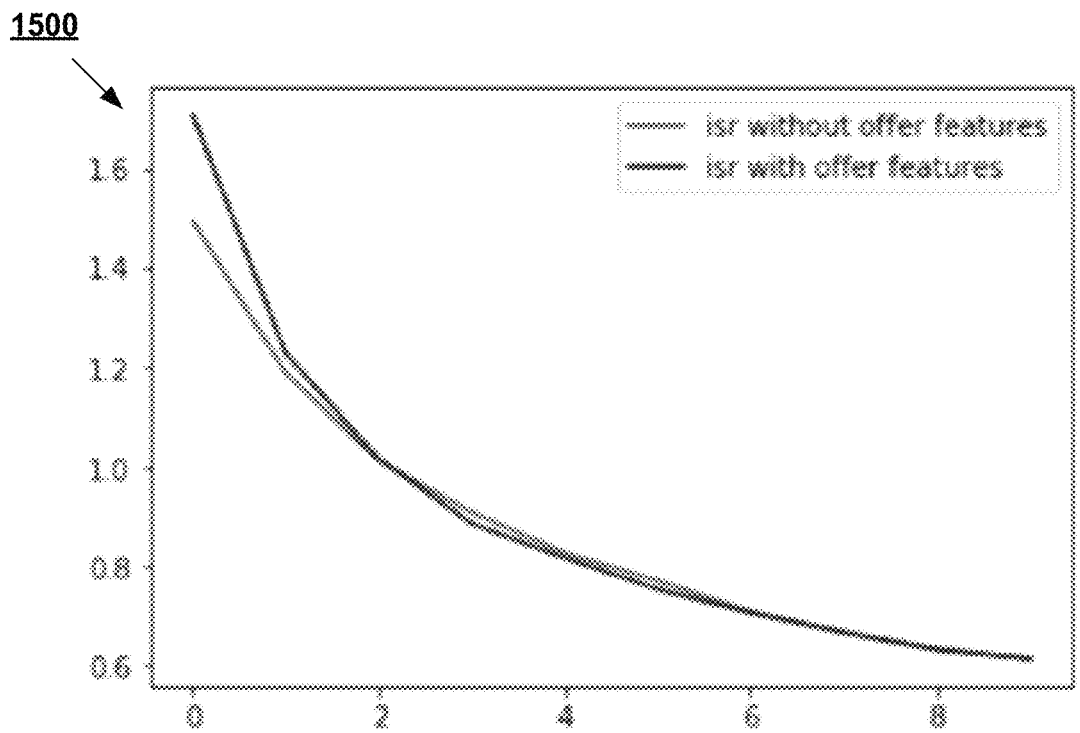
FIG. 15A illustrates an example graph comparing incremental sales ratios (ISR) for models trained with and without offer or promotion specific features for the guests.
Figure 15B:
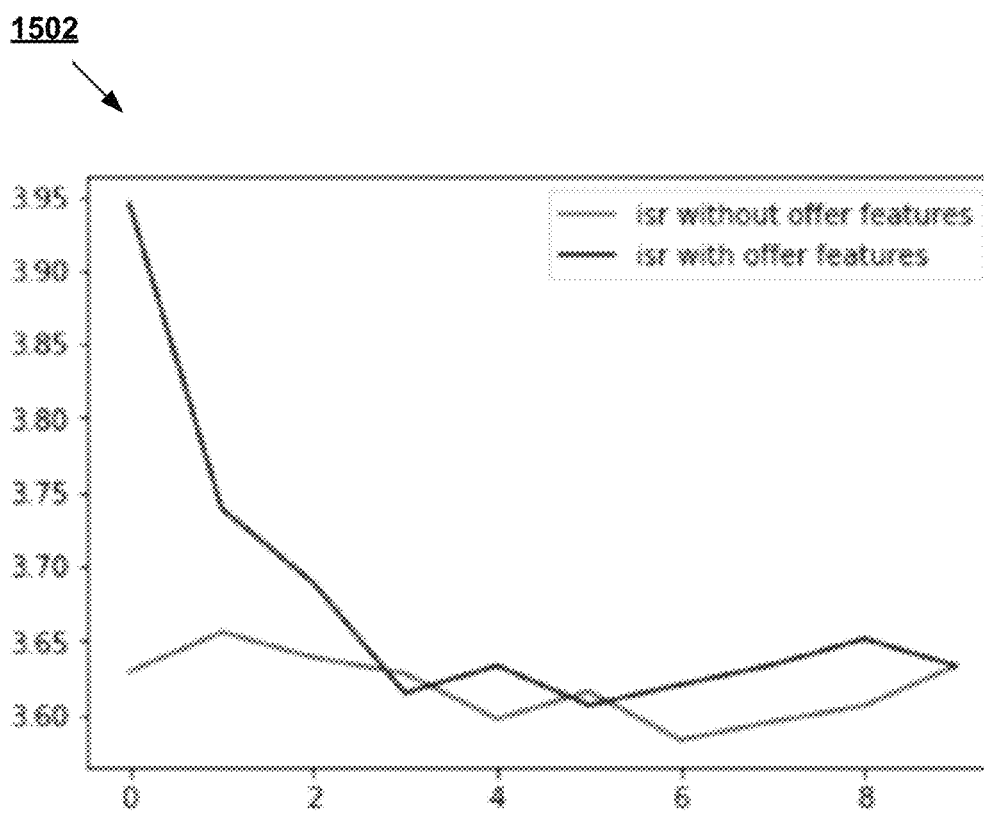
FIG. 15B illustrates an example graph comparing modified incremental sales ratios or (ISR_Mod) for models trained with and without offer or promotion specific features for the guests.

FIG. 15A and FIG. 15B example graphs 1500 and 1502 illustrating example graphs comparing incremental sales ratios for models trained with and without offer specific features for the guests. Referring to FIG. 15A, the graph 1500 is constructed using the incremental sales ratio (ISR) equation illustrated in FIG. 9A. Referring to FIG. 15B, the graph 1502 is constructed using the ISR equation illustrated in FIG. 9B. The ISR is relatively similar when including or not including offer features in the data when the ISR ratio does not take into account the number of guests who completed the offer as shown in the graph 1500. However, the ISR is significantly improved when a model which is trained with the offer features when using the ISR ratio which takes into account the number of guests who completed the offer as shown in the graph 1502. Accordingly, as shown in FIG. 15B, the incremental sales model is improved when the incremental sales model is trained with offer features.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method for modeling incremental sales for a retail enterprise, the method comprising:

receiving guest profile data including historical campaign data for a plurality of guests and a set of features for each guest;
receiving a proposed promotion with a campaign goal;
generating a proxy campaign by:
  determining an eligible subset of guests from the plurality of guests for the proxy campaign based on the proposed promotion;
  for each eligible guest in the eligible subset of guests, calculating a ratio of promotional spend per item purchased by the eligible guest; and
  selecting a first group of guests for a treatment segment and a second group of guests for a control segment based on the calculated ratios of promotional spend per item purchased to reflect a promotional spend per item bias in a historical campaign; and
training an uplift model to predict an uplift score for each of the plurality of guests with the proposed promotion using the guest profile data for the first group of guests in the treatment segment and the guest profile data for the second group of guests in the control segment, wherein predicted uplift scores are indicative of which guests would likely meet the campaign goal if given the proposed promotion and are unlikely to meet the campaign goal if not given the proposed promotion, and
wherein the proxy campaign is different from historical campaigns stored in the historical campaign data.

2. The method of claim 1, the method further comprising:
predicting an uplift score for each of the plurality of guests using the uplift model; and
selecting guests for the proposed promotion based on the predicted uplift scores.

3. The method of claim 1, the method further comprising:
predicting an uplift score for each of the plurality of guests using the uplift model; and
determining an optimized uplift threshold for the proposed promotion by:
  segmenting the plurality of guests into a plurality of groups based on the predicted uplift scores;
  calculating an incremental sales ratio for each of the plurality of groups; and
  determining the optimized uplift threshold for the proposed promotion based on the calculated incremental sales ratios for the plurality of groups.

4. The method of claim 3, wherein the incremental sales ratio is calculated according to the equation:

$$ISR = \frac{(\text{avg. treatment spend} - \text{avg. control spend}) \times \text{\# of guests in treatment}}{\text{offer discount} \times \text{\# guests in treatment}}.$$

5. The method of claim 3, wherein the incremental sales ratio is calculated according to the equation:

$$ISR = \frac{(\text{avg. treatment spend} - \text{avg. control spend}) \times \text{\# of guests in treatment}}{\text{offer discount} \times \text{\# guests in treatment who completed offer}}.$$

6. The method of claim 1, wherein training the uplift model further comprises:
training a treatment model to predict a treatment score for the plurality of guests when given the proposed promotion using the guest profile data for the first group of guests in the treatment segment;
training a control model to predict a control score for the plurality of guests when not given the proposed promotion using the guest profile data for the second group of guests in the control segment; and
calculating the uplift score for each of the plurality of guests by subtracting the control score from the treatment score.

7. The method of claim 1, wherein the guest profile data further includes a response variable for at least some of the plurality of guests, the response variable indicating whether the guest redeemed and completed a previous campaign goal and/or a previous promotion.

8. The method of claim 1, wherein the guest profile data further includes a response variable, wherein the response variable is an amount spent by the guest with and/or without one or more previous promotions.

9. The method of claim 1, wherein the set of features for a guest include one or more of:
(1) a total amount spent by the guest over a defined time period;
(2) a total amount spent by the guest over the defined time period with a promotion;
(3) an amount spent at a most recent trip;
(4) a number of days since the guest last shopped;
(5) a proportion of holidays the guests shopped; and
(6) products previously purchased by the guest.

10. The method of claim 1, wherein selecting the first group of guests for the treatment segment and the second group of guests for the control segment further comprises:
ranking the eligible subset of guests by the calculated ratio of promotional spend per item purchased; and
selecting the first group of guests from the eligible subset of guests with the ratio of promotional spend per item purchased above a threshold and the second group of guests from the eligible subset of guests with the ratio of promotional spend per item purchased below the threshold.

11. The method of claim 1, wherein selecting the first group of guests for the treatment segment and the second group of guests for the control segmented further comprises:
randomly sampling the eligible subset of guests for the first group of guests and the second group of guests.

12. The method of claim 1, wherein the first group of guests includes a first bias for an increase in purchase behaviors as compared to the second group of guests, wherein the first bias reflects natural behavior or characteristic of a guest receiving treatment or promotion in a historical campaign.

13. A platform for execution of machine learning models within a retail organization, the platform comprising:
one or more computing systems each including one or more processors and a memory, the memory storing instructions that cause the one or more computing systems to:
  receive guest profile data including historical campaign data for a plurality of guests and a set of features for each guest;
  receive a proposed promotion with a campaign goal;
  generate a proxy campaign, wherein to generate the proxy campaign includes to:
    determine an eligible subset of guests from the plurality of guests for the proxy campaign based on the proposed promotion;
    for each eligible guest in the eligible subset of guests, calculate a ratio of promotional spend per item purchased by the eligible guest; and select a first group of guests for a treatment segment and a second group of guests for a control segment based on the calculated ratios of promotional spend per item purchased to reflect a promotional spend per item bias in a historical campaign; and train an uplift model to predict an uplift score for each of the plurality of guests with the proposed promotion using the guest profile data for the first group of guests in the treatment segment and the guest profile data for the second group of guests in the control segment, wherein predicted uplift scores are indicative of which guests would likely meet the campaign goal if given the proposed promotion and are unlikely to meet the campaign goal if not given the proposed promotion, and wherein the proxy campaign is different from historical campaigns stored in the historical campaign data.

14. The platform of claim 13, wherein the instructions further cause the one or more computing systems to:
predict an uplift score for each of the plurality of guests using the uplift model; and
select guests for the proposed promotion based on the predicted uplift scores.

15. The platform of claim 14, wherein the instructions further cause the one or more computing systems to:
calculate a total incremental sales lift for the proposed promotion based on the predicted uplift scores for the selected guests.

16. The platform of claim 15, wherein the instructions further cause the one or more computing systems to:
generate a visualization comparing the total incremental sales lift for the proposed promotion with at least one historical campaign.

17. The platform of claim 13, wherein the instructions further cause the one or more computing systems to:
predict an uplift score for each of the plurality of guests using the uplift model;
rank the plurality of guests into deciles based on the predicted uplift scores;
calculate an incremental sales ratio for each of the deciles; and
determine an optimized uplift threshold for the proposed promotion based on the calculated incremental sales ratios for each of the deciles.

18. The platform of claim 17, wherein the instructions further cause the one or more computing systems to:
generate a visualization displaying the predicted uplift scores for each decile.

19. A computer implemented method for selecting guests for a proposed promotion, the computer implemented method comprising:
receiving the proposed promotion;
generating a proxy campaign by:
determining an eligible subset of guests from a plurality of guests for the proxy campaign based the proposed promotion;
for each eligible guest in the eligible subset of guests, calculating a ratio of promotional spend per item purchased by the eligible guest; and
selecting a first group of guests for a treatment segment and a second group of guests for a control segment based on based on the calculated ratios of promotional spend per item purchased to reflect a promotional spend per item bias in a historical campaign;
training an uplift model to predict an uplift score for each of the plurality of guests with the proposed promotion using:
historical campaign data and guest features for the first group of guests in the treatment segment; and
historical campaign data and guest features for the second group of guests in the control segment;
predicting an uplift score for each of the plurality of guests using the uplift model, wherein predicted uplift scores are indicative of which guests would likely meet the campaign goal if given the proposed promotion and are unlikely to meet the campaign goal if not given the proposed promotion;
determining a threshold uplift score which provides an optimal incremental sales value for the proposed promotion based on the predicted uplift scores for the plurality of guests; and
selecting the guests from the plurality of guests with a predicted uplift score above the threshold uplift score for the proposed promotion,
wherein the proxy campaign is different from historical campaigns stored in the historical campaign data.

20. The computer implemented method of claim 19, the computer implemented method further comprising:
implementing a campaign by providing the proposed promotion to the selected guests;
receiving campaign data in-real time from point of sale computing systems; and
validating the uplift model with the received campaign data.

* * * * *